United States Patent
Shi

(10) Patent No.: US 10,222,672 B2
(45) Date of Patent: Mar. 5, 2019

(54) COLOR FILTER, METHOD OF MANUFACTURING THE SAME AND DISPLAY DEVICE

(71) Applicant: BOE TECHNOLOGY GROUP CO., LTD., Beijing (CN)

(72) Inventor: Yue Shi, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 103 days.

(21) Appl. No.: 14/347,041

(22) PCT Filed: Dec. 12, 2013

(86) PCT No.: PCT/CN2013/089218
§ 371 (c)(1),
(2) Date: Mar. 25, 2014

(87) PCT Pub. No.: WO2014/173140
PCT Pub. Date: Oct. 30, 2014

(65) Prior Publication Data
US 2015/0153623 A1 Jun. 4, 2015

(30) Foreign Application Priority Data

Apr. 24, 2013 (CN) .......................... 2013 1 0146511

(51) Int. Cl.
*G02F 1/163* (2006.01)
*G02F 1/157* (2006.01)
*G02F 1/1335* (2006.01)
*G02F 1/155* (2006.01)

(52) U.S. Cl.
CPC ........ *G02F 1/157* (2013.01); *G02F 1/133512* (2013.01); *G02F 1/133514* (2013.01); *G02F 1/155* (2013.01); *G02F 2203/62* (2013.01)

(58) Field of Classification Search
CPC .............. G02F 1/157; G02F 1/133512; G02F 1/133514; G02F 1/155; G02F 2203/62
(Continued)

(56) References Cited

U.S. PATENT DOCUMENTS 5,846,854 A * 12/1998 Giraud ................ G02F 1/13439
257/59
7,333,257 B2 2/2008 Reynolds et al.
(Continued)

FOREIGN PATENT DOCUMENTS

| CN | 101097343 A | 1/2008 |
|---|---|---|
| CN | 102879946 A | 1/2013 |

(Continued)

OTHER PUBLICATIONS

International Search Report in PCT/CN2013/089218 dated Mar. 13, 2014.
(Continued)

*Primary Examiner* — Joseph P Martinez
*Assistant Examiner* — Vipin Patel
(74) *Attorney, Agent, or Firm* — Collard & Roe, P.C.

(57) ABSTRACT

A color filter comprises a substrate (1), color filter layers, and a black matrix (3). A first transparent conductive layer (2) is provided on a side of the black matrix (3) close to the substrate (1). A second transparent conductive layer (4) is provided on a side of the black matrix (3) facing away from the substrate (1). The black matrix (3) is made of an electrochromic material. A display device including the color filter and a manufacturing method of the color filter are provided. The color filter allows the display device with good outdoor readability and excellent indoor display effect.

20 Claims, 2 Drawing Sheets

(58) Field of Classification Search
USPC .................................................. 359/275, 257
See application file for complete search history.

(56) References Cited

U.S. PATENT DOCUMENTS

| | | | |
|---|---|---|---|
| 7,695,874 B2* | 4/2010 | Huang .................... | G02B 5/201 430/7 |
| 2007/0138941 A1* | 6/2007 | Jin et al. ........................ | 313/503 |
| 2008/0002110 A1* | 1/2008 | Choi ................. | G02F 1/133514 349/106 |
| 2008/0182184 A1* | 7/2008 | Zhan ................................ | 430/7 |
| 2011/0261301 A1 | 10/2011 | Noh et al. | |
| 2012/0038966 A1* | 2/2012 | Yeh ....................... | G02F 1/1521 359/268 |
| 2014/0085578 A1* | 3/2014 | Gu .................... | G02F 1/133514 349/106 |

FOREIGN PATENT DOCUMENTS

| | | |
|---|---|---|
| CN | 1029449952 A | 2/2013 |
| CN | 103217832 A | 7/2013 |
| JP | 2002365671 A | 12/2002 |
| KR | 20070097810 A | 10/2007 |
| WO | 2005/053005 A2 | 6/2005 |

OTHER PUBLICATIONS

International Preliminary Report on Patentability and Written Opinion of the International Searching Authority of PCT/CN2013/089218 dated Mar. 13, 2014.

Chinese Office Action of Chinese Application No. 201310146511.X, dated Jan. 30, 2015 with English translation.

* cited by examiner

COLOR FILTER, METHOD OF MANUFACTURING THE SAME AND DISPLAY DEVICE

CROSS REFERENCE TO RELATED APPLICATIONS

This application is the National Stage of PCT/CN2013/089218 filed on Dec. 12, 2013, which claims priority under 35 U.S.C. § 119 of Chinese Application No. 201310146511.X filed on Apr. 24, 2013, the disclosure of which is incorporated by reference. The international application under PCT article 21(2) was not published in English.

TECHNICAL FIELD

Embodiments of the present invention relate to a color filter, a method of manufacturing the same and a display device.

BACKGROUND

So far, with the development of technology and the advancement of society, liquid crystal displays have been applied in industrial productions more and more widely and play more important roles in human's life.

In an Advanced Super Dimensional Switching (AD-SDS) technology, a multi-dimensional electric field is formed by an electric field generated at edges of slit electrodes in a same plane and an electric field generated between a slit electrode layer and a plate electrode layer, so that the liquid crystal molecules at all orientations, which are located directly above the electrodes and between the slit electrodes in a liquid crystal cell, can be rotated, which improves the work efficiency of the liquid crystals and increases the light transmission efficiency. The Advanced Super Dimensional Switching technology can improve the picture quality of TFT-LCDs and has advantages of high resolution ratio, high transmissivity, wide viewing angle, high aperture ratio, low chromatic aberration, no push Mura, and the like. For different applications, the improved technologies of ADS include high transmittance I-ADS technology, high aperture ratio H-ADS and high resolution S-ADS technology.

ADS liquid crystal display panels have the advantage of super-wide viewing angle, however, their display effect under the sun is still not good as that of an ordinary transmission-type liquid crystal displays.

A conventional color filter typically includes a substrate, a conductive layer, a black matrix and a color filter layer including typically pixel units of red, green and blue colors with the black matrix disposed between adjacent filter layers. In order to improve the outdoor readability of the liquid crystal display, a transflective technology is proposed to improve the use effect of the liquid crystal display under the sun to a certain extent. Since a transflective liquid crystal display needs a liquid crystal cell with two different thicknesses in one sub-pixel due to its structure design, difficulties in its optical design and fabrication process are increased, particularly in the rubbing process in which many dead corners will be incapable of being aligned. At the same time, normally, none of the design mode for the transflective type liquid crystal cells has wide-viewing angle.

Currently, it is proposed to refine or remove the black matrix material so as to improve the aperture ratio of pixels and increase the data lines' reflectivity for the sunlight, and thus to improve the outdoor readability of the ADS products. This method has a greatest advantage of simplifying manufacture process, but it is likely to present "color mixing" phenomenon. When it is used outdoors, though color mixing occurs, human eyes are not easily perceive it due to the high external light intensity, therefore the "color mixing" phenomenon will not influence outdoor use. However, when used indoors, the "color mixing" can be easily perceived by human eyes, which makes it not suitable for use indoors.

SUMMARY

In accordance with one aspect of the present invention, a color filter is provided, comprising: a substrate, color filter layers, and a black matrix, wherein said black matrix have a plurality of openings for disposing color filter layers, a first transparent conductive layer is provided on a side of said black matrix close to said substrate, a second transparent conductive layer is provided on a side of said black matrix facing away from said substrate, and said black matrix is made of an electrochromic material.

In an embodiment, said first transparent conductive layer covers the entire said substrate or covers an area where said black matrix is, and said second transparent conductive layer covers said black matrix.

In an embodiment, a transparent protective layer is provided on a side of said second transparent conductive layer facing away from said substrate.

In accordance with another aspect of the present invention, a display device is provided comprising the above-described color filter.

In accordance with yet another aspect of the present invention, a method of manufacturing a color filter is provided, comprising:

forming a first transparent conductive layer on a substrate;

forming a black matrix having a plurality of openings for disposing color filter layers on a side of said first transparent conductive layer facing away from said substrate, said black matrix being made of an electrochromic material;

forming a second transparent conductive layer on a side of said black matrix facing away from said first transparent conductive layer; and forming color filter layers in the openings' area of said black matrix over said substrate.

In an embodiment, said forming color filter layers over said substrate is carried out before said forming the first transparent conductive layer on the substrate.

In an embodiment, said forming color filter layers over said substrate is carried out between said forming the first transparent conductive layer on said substrate and said forming a black matrix having a plurality of openings for disposing color filter layers on a side of said first transparent conductive layer facing away from said substrate.

In an embodiment, said forming color filter layers over said substrate is carried out between said forming a black matrix having a plurality of openings for disposing color filter layers on a side of said first transparent conductive layer facing away from said substrate and said forming a second transparent conductive layer on a side of said black matrix facing away from said first transparent conductive layer.

In an embodiment, said forming color filter layers over said substrate is carried out after said forming a second transparent conductive layer on a side of said black matrix facing away from said first transparent conductive layer.

In an embodiment, said first transparent conductive layer covers the entire said substrate or covers an area where said black matrix is, and said second transparent conductive layer covers said black matrix.

In an embodiment, said method of manufacturing a color filter further comprises forming a transparent protective layer on a side of said second transparent conductive layer facing away from said substrate.

BRIEF DESCRIPTION OF THE DRAWINGS

Embodiments of the present invention will be described in more detail below with reference to the accompanying drawings to allow one of ordinary skill in the art to understand the present invention more clearly, and wherein.

In the figures, 1, substrate; 2, first transparent conductive layer; 3, black matrix; 4, second transparent conductive layer; 51, red pixel unit; 52, green pixel unit; 53, blue pixel unit; 6, transparent protective layer

DETAILED DESCRIPTION OF THE PREFERRED EMBODIMENTS

In order to make objects, technical details and advantages of the embodiments of the invention apparent, technical solutions according to the embodiments of the present invention will be described clearly and completely as below in conjunction with the accompanying drawings of embodiments of the present invention. It is apparent that the described embodiments are only a part of but not all of exemplary embodiments of the present invention. Based on the described embodiments of the present invention, various other embodiments can be obtained by those of ordinary skill in the art without creative labor and those embodiments shall fall into the protection scope of the present invention.

Unless otherwise defined, all the technical and scientific terms used herein have the same meanings as commonly understood by one of ordinary skill in the art to which the present invention belongs. The terms, such as "first," "second" or the like, which are used in the description and the claims of the present application, are not intended to indicate any sequence, amount or importance, but for distinguishing various components. Also, the terms, such as "a/an," "one," "the/said" or the like, are not intended to limit the amount, but for indicating the existence of at lease one. The terms, such as "comprise/comprising," "include/including" or the like, are intended to specify that the elements or the objects stated before these terms encompass the elements or the objects and equivalents thereof listed after these terms, but not preclude other elements or objects. The terms, such as "connect/connecting/connected," or the like, are not intended to define a physical connection or mechanical connection, but may include an electrical connection/coupling, directly or indirectly. The terms, such as "On," "under," "left," "right," or the like, are only used to indicate relative position relationship, and when the position of the object which is described is changed, the relative position relationship may be changed accordingly.

Embodiment 1

Figure 1:
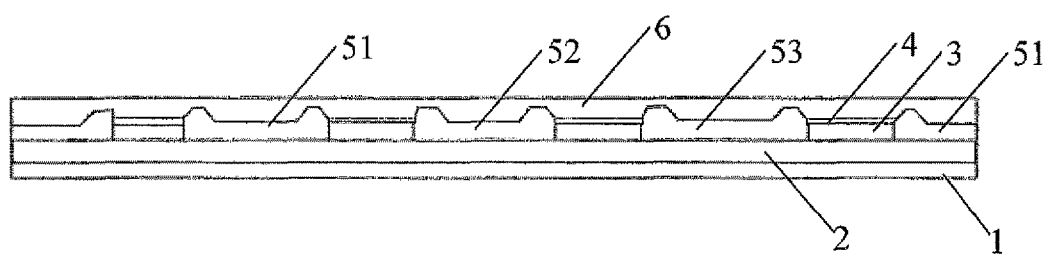
FIG. 1 is a structural schematic view of a color filter according to an embodiment of the present invention.

As shown in FIG. 1, a color filter according to an embodiment of the present invention comprises a substrate 1, color filter layers and a black matrix 3 having a plurality of openings for disposing the color filter layers. A first transparent conductive layer 2 is disposed on a side of the black matrix 3 close to the substrate 1. A second transparent conductive layer 4 is disposed on a side of the black matrix facing away from the substrate 1. The black matrix 3 is made of an electrochromic material.

The substrate 1 may be a substrate of glass, quartz, transparent resin, or the like.

The electrochromic material can experience stable and reversible color change under the action of an external electric field. When the first transparent conductive layer 2 and the second transparent conductive layer 4 are energized, the black matrix 3 made of electrochromic material exhibits black, which is suitable for indoor use. When the first transparent conductive layer 2 and the second transparent conductive layer 4 are de-energized, the black matrix 3 exhibits transparent state, which is suitable for outdoor use. For outdoor use, depending on the intensity of outdoor sunlight, it is also possible to change the light transmittance of the black matrix 3 by controlling the voltage across the black matrix 3 so as to find a tradeoff between outdoor readability and display quality.

The first transparent conductive layer 2 covers the entire substrate 1 or covers an area where the black matrix 3 is. The second transparent conductive layer 4 covers the black matrix 3. For example, the first transparent conductive layer 2 covers the entire substrate 1 and can control the energizing or de-energizing state of the entire black matrix 3 at the same time, thus allowing consistency of display.

In addition, a transparent protective layer 6 may be further provided on a side of the second transparent conductive layer 4 facing away from the substrate 1.

The width of the black matrix 3 is much smaller than the width of any one of the pixel units in the color filter layers and therefore it will not adversely influence the deflection of the liquid crystal molecules. The color filter layer in this embodiment will be described with respect to an example in which red pixel units 51, green pixel units 52 and blue pixel units 53 are provided. It is to be noted that the color filter layers may further include any one or more of other color pixel units, such as yellow pixel units and transparent pixel units, depending on design requirements, and the present invention is not limited to the above described example.

The above described technical solution provides a color filter with a black matrix 3 made of electrochromic material, and a first transparent conductive layer 2 and a second transparent conductive layer 4 are provided on two sides of the black matrix 3 respectively. The transmittance of the black matrix 3 in the color filter is controlled by adjusting the voltage between the first and second transparent conductive layers 2, 4 to allow the transmittance of black matrix 3 to be adjustable, hence changing the light transmissivity of the color filter. In this way, it is possible to endow the display device with both good outdoor readability and excellent indoor display effect.

Embodiment 2

An embodiment of the present invention further provides a display device comprising the color filter described in the above embodiment 1. The display device may be any product or component with display function, such as a liquid crystal panel, a cell phone, a flat computer, a TV set, a display, a notebook computer, a digital picture frame or a navigator. The display device may include the color filter described in embodiment 1 and a switching element array substrate. The black matrix 3 of the color filter of the display device is made of an electrochromic material. And a first transparent conductive layer 2 and a second transparent conductive layer 4 are provided on two sides of the black matrix 3 respectively. The transmittance of the black matrix 3 in the color filter is controlled by adjusting the voltage between the first and second transparent conductive layers 2, 4 to make the transmittance of black matrix 3 adjustable, hence changing the light transmissivity of the color filter. In this way, it is possible to endow the ADS display device with both good outdoor readability and excellent indoor display effect. For example, the liquid crystal panel is applicable to large size products, such as DID (Digital Information Display) splicing screen for outdoor advertisements.

Embodiment 3

The present invention further provides a method of manufacturing the color filter of embodiment 1, comprising:

S1, forming a first transparent conductive layer 2 on a substrate 1.

For example, the transparent conductive film layer may be formed on the substrate 1 by sputtering, spraying, coating or evaporating process.

It is to be noted that when the transparent conductive layer covers the entire substrate 1, the above described transparent conductive film layer is the first transparent conductive layer 2. When the transparent conductive layer covers only an area where the black matrix 3 is, a patterning process is required after forming the transparent conductive film layer, so as to form the designed pattern. The patterning process generally includes photoresist coating, exposure, development, etching, and photoresist stripping.

S2, forming a black matrix 3 having a plurality of openings for disposing color filter layers on a side of the first transparent conductive layer 2 facing away from the substrate 1. The black matrix 3 is made of an electrochromic material.

For example, the method for forming the black matrix 3 with a plurality of openings for disposing color filter layers is: forming a black matrix coating of the electrochromic material by sputtering, spraying, coating or evaporating process on the substrate 1 with the first transparent conductive layer 2, then coating a layer of photoresist on the black matrix coating, then forming a plurality of openings for disposing color filter layers by using a mask to perform exposing, developing, etching, and photoresist stripping process, and thus completing the black matrix 3 with a plurality of openings for disposing color filter layers. It is to be noted that for film layers requiring patterning (e.g., the black matrix coating in an embodiment of the present invention), if the film layer material is photosensitive itself, the photoresist coating, etching and stripping process may be omitted in the patterning process.

S3, forming a second transparent conductive layer 4 on a side of the black matrix 3 facing away from the first transparent conductive layer 2.

For example, the transparent conductive film layer may be formed on the substrate 1 by sputtering, spraying, coating or evaporation process.

It is to be noted that a patterning process is required after forming the transparent conductive film layer to form the designed pattern, because the second transparent conductive layer 4 covers only an area where the black matrix 3 is. The patterning process generally includes processes of photoresist coating, exposure, development, etching, photoresist stripping, and the like.

The method of manufacturing the color filter may further comprise: forming color filter layers on the substrate 1, which are disposed in the opening areas of the black matrix 3.

Figure 2:
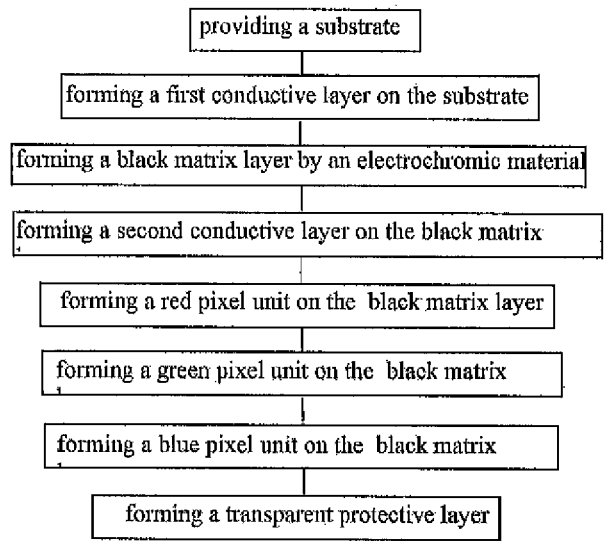
FIG. 2 is a flow chart of a method of manufacturing a color filter according to an embodiment of the present invention.

For example, it is possible to form the first transparent conductive layer 2 on the substrate 1 firstly, and then form the black matrix 3 with a plurality of openings for disposing color filter layers, and then form color filter layers and the second transparent conductive layer 4 on the black matrix 3. The method for forming color filter layers and the second transparent conductive layer 4 may be that the step for forming color filter layers over the substrate 1 is carried out between steps S2 and S3, or the step for forming the color filter layers over the substrate 1 is carried out after step S3:

Method A, as shown in FIG. 2, a second transparent conductive layer 4 is firstly formed on the black matrix 3 layer with a plurality of openings for disposing color filter layers by sputtering, spraying, coating or evaporating and by patterning process, then pixel resin is coated in the opening areas of the black matrix 3 having the second transparent conductive layer 4, and color filter layers are formed in the opening areas by back exposure and development with a mask. This embodiment is descried with respect to an example in which the color filter layer includes red, green and blue pixel units to form pixel units of these three colors. It is to be noted that the manufacturing order of red, green, blue pixel units is not limited hereto, any other order variations of the three units are within the scope of the present invention. The pixel resin may be conventional materials containing pigment liquid, alkali soluble film forming resin, polyfunctional monomer and photoinitiator. The film forming resin is methacrylic acid resin, for example.

Figure 3:
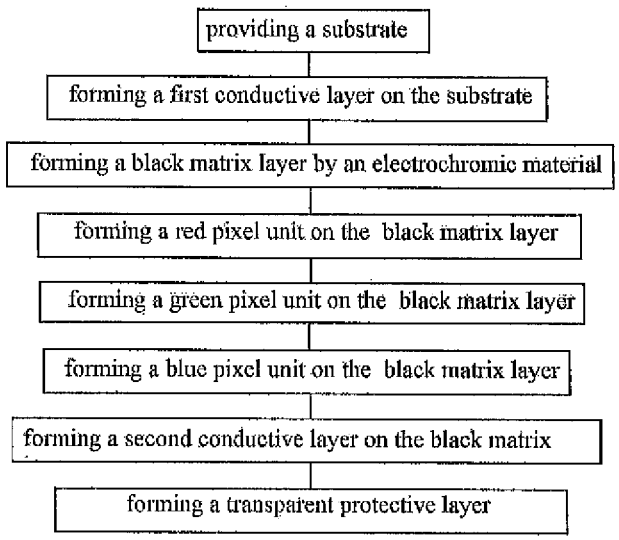
FIG. 3 is a flow chart of another method of manufacturing a color filter according to an embodiment of the present invention.

Method B, as shown in FIG. 3, firstly, pixel resin is coated in the opening areas of the black matrix 3, and the color filter layers are formed in the opening areas by back exposure and development with a mask, then a second transparent conductive layer 4 is formed on the surfaces of the black matrix 3 and the color filter layers by sputtering, spraying, coating or evaporating and by patterning process. This embodiment is descried with respect to an example in which the color filter layer includes red, green and blue pixel units to form pixel units of these three colors. It is to be noted that the manufacturing order of red, green, blue pixel units is not limited hereto, any other order variations of the three units is within the scope of the present invention.

The black matrix formed with the above described first method A has better conductive properties than that of the black matrix formed with the second method B.

For example, it is also possible that the step for forming color filter layers on the substrate 1 is before step S1 in the method. For example, pixel resin is firstly coated on the substrate 1 and exposed and developed with a mask to form color filter layers in areas at which the plurality of openings of the black matrix 3 are to be located, namely pixel areas. Then, the first transparent conductive layer 2, the black matrix 3 and the second transparent conductive layer 4 are formed over the substrate 1 with color filter layers formed thereon. Methods for forming the above described layers are the same as the aforementioned embodiments and will not be described here in detail.

For example, it is also possible that the step for forming color filter layers over the substrate 1 is carried out between steps S1 and S2 in said method. For example, the first transparent conductive layer 2 is formed on the substrate 1, next, the color filter layers are formed on the first transparent conductive layer 2, and then the black matrix 3 is formed on the color filter layers. For example, pixel resin of a plurality of colors is firstly coated on a side of the first transparent conductive layer 2 facing away from the substrate 1 and exposed, developed with a mask to form the color filter layers; and then photoresist for black matrix (with photosensitive characteristic) is formed over the substrate 1 with color filter layers formed thereon, and back exposed and developed by using the pixel resin layer as a mask to form the black matrix 3. If the material for black matrix is not photosensitive, photoresist is required and the black matrix 3 is formed by conventional patterning process (as described in step S2) which is not described here in detail. Finally, a second transparent conductive layer 4 is formed on a side of the black matrix 3 facing away from the first transparent conductive layer 2.

For example, the method of manufacturing the color filter according to an embodiment of the present invention further comprises forming a transparent protective layer 6 on a side of the second transparent conductive layer 4 facing away from the substrate 1.

The first transparent conductive layer 2 may cover the entire substrate 1 or cover the area where the black matrix 3 is, and the second transparent conductive layer 4 covers the entire black matrix 3, For example, the first transparent conductive layer 2 covers the entire substrate 1 and can control energizing or de-energizing state of the entire black matrix 3 at the same time, thus allowing consistency of display. A transparent protective layer 6 is provided on a side of the second transparent conductive layer 4 facing away from the substrate 1.

The method of manufacturing the color filter provided in the above described technical solutions has simple manufacture process. In the method, the black matrix 3 is made of electrochromic material, and the first transparent conductive layer 2 and the second transparent conductive layer 4 are formed on the two sides of the black matrix 3 respectively. The transmittance of the black matrix 3 in the color filter is controlled by adjusting the voltage between the first and second transparent conductive layers 2, 4 to make the transmittance of black matrix 3 adjustable, thus it can change the light transmissivity of the color filter which endows the display device with both good outdoor readability and excellent indoor display effect.

What have been described above are only illustrative implementations of the present invention. It should be noted that for those of ordinary skill in the art, various modifications and substitutions may be made without departing from the technical principles of the present invention which should also be within the protection scope of the present invention.

The described above are only illustrative embodiments of the present invention. For one of ordinary skill in the art, various modifications and improvements may be made without departing from the spirit and gist of embodiments of the present invention, and all of which should fall within the protection scope of the present invention.

What is claimed is:

1. A color filter comprising:
   a substrate,
   color filter layers, and
   a black matrix, wherein said black matrix have a plurality of openings for disposing color filter layers, a first transparent conductive layer is provided on a side of said black matrix close to said substrate, a second transparent conductive layer is provided on a side of said black matrix facing away from said substrate, said black matrix is made of an electrochromic material, said first transparent conductive layer covers at least an area where said black matrix is, said second transparent conductive layer only and entirely covers an area where said black matrix is to control a voltage difference across said black matrix with the first transparent conductive layer, and the black matrix is positioned in a same layer as the color filter layer and the voltage between the first transparent conductive layer and the second transparent conductive layer adjusts a transmittance of the black matrix positioned in the same layer as the color filter layer.

2. The color filter according to claim 1, wherein said first transparent conductive layer covers the entire said substrate.

3. The color filter according to claim 1, wherein a transparent protective layer is provided on a side of said second transparent conductive layer facing away from said substrate.

4. A display device comprising the color filter according to claim 1.

5. The color filter according to claim 2, wherein a transparent protective layer is provided on a side of said second transparent conductive layer facing away from said substrate.

6. The color filter according to claim 1, wherein the black matrix is a single layer.

7. A method of manufacturing a color filter, comprising:
   forming a first transparent conductive layer on a substrate;
   forming a black matrix having a plurality of openings for disposing color filter layers on a side of said first transparent conductive layer facing away from said substrate, said black matrix being made of an electrochromic material;
   forming a second transparent conductive layer on a side of said black matrix facing away from said first transparent conductive layer; and
   forming color filter layers in the openings' area of said black matrix over said substrate,
   wherein said first transparent conductive layer covers at least an area where said black matrix is, and said second transparent conductive layer only and entirely covers an area where said black matrix is to control a voltage difference across said black matrix with the first transparent conductive layer, and the black matrix is positioned in a same layer as the color filter layer, and the voltage between the first transparent conductive layer and the second transparent conductive layer adjusts a transmittance of the black matrix positioned in the same layer as the color filter layer.

8. The method of manufacturing a color filter according to claim 7, wherein said forming color filter layers over said substrate is carried out before said forming the first transparent conductive layer on the substrate.

9. The method of manufacturing a color filter according to claim 8, wherein said first transparent conductive layer covers the entire said substrate.

10. The method of manufacturing a color filter according to claim 8, further comprising:
    forming a transparent protective layer on a side of said second transparent conductive layer facing away from said substrate.

11. The method of manufacturing a color filter according to claim 7, wherein said forming color filter layers over said substrate is carried out between said forming the first transparent conductive layer on said substrate and said forming a black matrix having a plurality of openings for disposing color filter layers on a side of said first transparent conductive layer facing away from said substrate.

12. The method of manufacturing a color filter according to claim 11, wherein said first transparent conductive layer covers the entire said substrate.

13. The method of manufacturing a color filter according to claim 11, further comprising:
forming a transparent protective layer on a side of said second transparent conductive layer facing away from said substrate.

14. The method of manufacturing a color filter according to claim 7, wherein said forming color filter layers over said substrate is carried out between said forming a black matrix having a plurality of openings for disposing color filter layers on a side of said first transparent conductive layer facing away from said substrate and said forming a second transparent conductive layer on a side of said black matrix facing away from said first transparent conductive layer.

15. The method of manufacturing a color filter according to claim 14, wherein said first transparent conductive layer covers the entire said substrate.

16. The method of manufacturing a color filter according to claim 14, further comprising:
forming a transparent protective layer on a side of said second transparent conductive layer facing away from said substrate.

17. The method of manufacturing a color filter according to claim 7, wherein said forming color filter layers over said substrate is carried out after said forming a second transparent conductive layer on a side of said black matrix facing away from said first transparent conductive layer.

18. The method of manufacturing a color filter according to claim 17, wherein said first transparent conductive layer covers the entire said substrate.

19. The method of manufacturing a color filter according to claim 7, wherein said first transparent conductive layer covers the entire said substrate.

20. The method of manufacturing a color filter according to claim 7, further comprising:
forming a transparent protective layer on a side of said second transparent conductive layer facing away from said substrate.

* * * * *